United States Patent [19]

Trenkler et al.

[11] 4,434,930

[45] Mar. 6, 1984

[54] PROCESS FOR PRODUCING REINFORCED STRUCTURAL ARTICLES

[75] Inventors: George Trenkler, East Providence, R.I.; Richard G. Delagi, Sharon, Mass.

[73] Assignee: Texas Instruments Incorporated, Dallas, Tex.

[21] Appl. No.: 311,574

[22] Filed: Oct. 15, 1981

[51] Int. Cl.³ .............................................. B23K 19/00
[52] U.S. Cl. ................................ 228/118; 29/421 R; 156/81; 228/157
[58] Field of Search ............. 428/594, 586; 29/421 R, 29/157.3 V; 228/118, 157; 156/79, 81; 106/87, 122

[56] References Cited

U.S. PATENT DOCUMENTS

| | | | |
|---|---|---|---|
| 2,212,481 | 8/1940 | Sendzimir | 228/118 |
| 2,772,180 | 11/1956 | Neel et al. | 106/286 |
| 2,990,608 | 7/1961 | Manning | 29/157.3 |
| 2,995,807 | 8/1961 | Gibbs | 29/157.3 |
| 3,004,330 | 10/1961 | Wilkins | 29/157.3 |
| 3,015,157 | 1/1962 | Reynolds et al. | 228/118 |
| 3,045,330 | 7/1962 | Johnson et al. | 29/157.3 |
| 3,164,894 | 1/1965 | Johnson et al. | 29/412 |
| 3,166,831 | 1/1965 | Keith | 29/155 R |
| 3,214,251 | 10/1965 | Brick | 228/118 |
| 3,222,763 | 12/1965 | Heuer | 29/157.3 |
| 3,271,846 | 9/1966 | Buechele et al. | 29/157.3 |
| 3,297,082 | 1/1967 | Tranel et al. | 165/170 |
| 3,346,936 | 10/1967 | Miller et al. | 29/157.3 |
| 3,371,399 | 3/1968 | Miller | 29/157.3 |
| 3,435,504 | 4/1969 | Miller | 228/118 |
| 3,466,726 | 9/1969 | Savolainen | 29/421 R |

Primary Examiner—L. Dewayne Rutledge
Assistant Examiner—J. J. Zimmerman
Attorney, Agent, or Firm—John A. Haug; James P. McAndrews; Melvin Sharp

[57] ABSTRACT

Reinforced structural elements are produced by taking two or more sheets of the same or different malleable metal and applying a pattern of thermally decomposable stop-off material on an interfacial surface, solid phase green bonding the sheets one to another by squeezing them through squeezing rollers and sintering the sheets to improve the metallurgical bond therebetween. The composite can be formed into complex configurations having compound reentrant surfaces and then raised above a predetermined temperature to decompose the stop-off material to generate gas and inflate the sheets contiguous to the pattern. The stop-off material can be chosen to decompose essentially completely at a temperature above the predetermined temperature which facilitates forming prior to inflation or the material can include a portion which decomposes at the sintering temperature of the metallic sheets employed giving a two stage inflation. The stop-off material may be applied in many different patterns including continuous and non-continuous areas, areas in the form of alpha-numeric symbols or areas to provide both a decorative effect and a structural reinforcement. In another example the pattern may be applied on the interfacial surfaces of several sheets in the form of spaced parallel strips offset from one sheet to the next, to provide a honeycomb structure.

10 Claims, 19 Drawing Figures

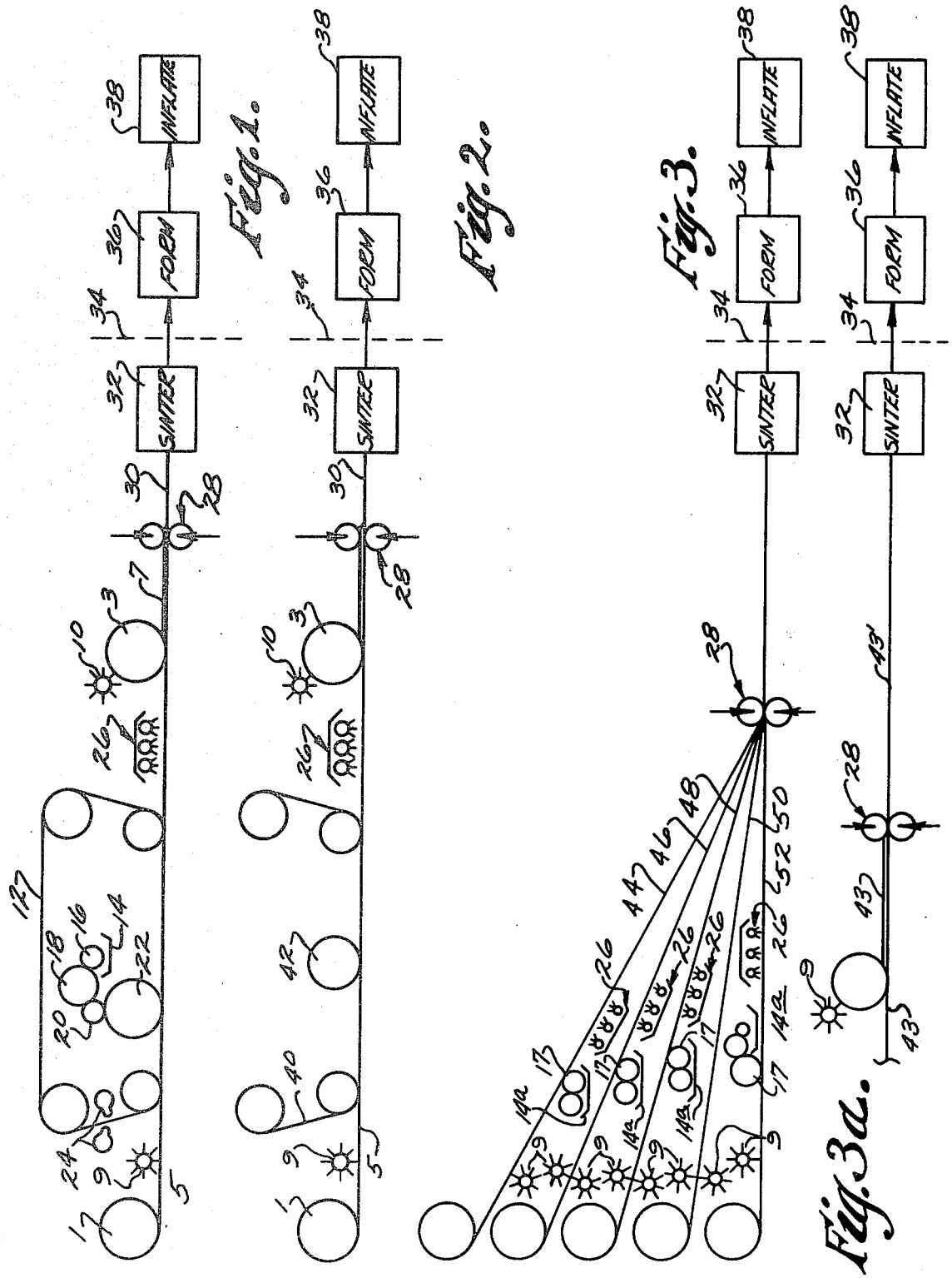

PROCESS FOR PRODUCING REINFORCED STRUCTURAL ARTICLES

This invention relates to copending patent applications Ser. Nos. 311,577 and 311,576 filed on Oct. 15, 1981, all bearing the same title.

This invention relates to composite metallic structures and more particularly to inflated structural articles and methods for making such articles.

It is known to apply patterns of bond interrupting material between sheets prior to bonding of the sheets. The sheets are then bonded together as by pressure bonding using squeezing rollers. Then typically, the sheets are placed in a jig or die and a nipple is inserted in to the interface between two sheets coincident with the bond interrupting material and hydraulic pressure is applied through the nipple between the sheets to inflate the sheets contiguous to the bond interrupting material. It is also known to use as the bond interrupting material sub stances which generate sufficient gas when raised to a particular temperature to effect inflation of the sheets as defined by the pattern of the bond interrupting material. The composites can be used for various purposes such as heat exchangers wherein a heat exchange medium is circulated through passageways defined by the pattern. Another use is as a low weight, reinforced structural member such as a honeycomb type structure. While such honeycomb structure is advantageously strong for its weight to volume ratio, its uses have been limited to very basic configurations such as flat or cylindrical due to the very nature of the element, i.e., its resistance to bending after inflation.

Among the several objects of the presents invention may be noted the production of a reinforced structural article that can readily be formed in any of a variety of configurations, another object is the provision of a method for making such articles which is inexpensive yet conducive to improved quality control, yet another object is the provision of a method which gives greater freedom in the design of light, low cost reinforced structural elements useful in a variety of different applications. Other objects and features will be in part apparent and in part pointed out hereinafter.

The invention accordingly comprises the elements and combination of elements, steps and sequence of steps, features of construction and manipulation, and arrangement of parts which will be exemplified in the constructions and methods hereinafter described, and the scope of which will be indicated in the following claims.

Briefly, in accordance with the invention sheets of malleable metal, either of the same or different metals, are solid-phase bonded one to the other in a conventional manner. Prior to bonding a pattern of stop-off material which includes thermally decomposable material is applied to one or more interfacial surfaces to inhibit bonding of the metal sheets contiguous with the pattern. The composite is then sintered to improve the metallurgical bond and then formed, as by cutting, stamping, bending, drawing, and the like into a selected configuration which can range from a generally planar element to a complex shaped element which includes compound reentrant surfaces. Finally, the formed composite is raised above a predetermined temperature to decompose the stop-off material thereby generating a gas which inflates the composite along the areas defined by the pattern. For certain articles it is desirable to provide a two stage inflation so that the stop-off material is chosen having a first portion which decomposes in a first range of temperatures such as in the range of the sintering temperatures for the particular metals involved while a second portion of the stop-off material decomposes above a pre-determined temperature higher than the first range of temperatures. For certain articles it is desirable to provide both a continuous and discontinuous passages to provide reinforcement in specific areas along with the facility of fluid conduction.

In the accompanying drawings, in which several of various possible embodiments of the invention are illustrated, FIG. 1 is a schematic diagram showing the steps involved in producing articles made in accordance with the invention;

FIG. 2 is a schematic diagram similar to FIG. 1 of a modification of the process involved in producing articles made in accordance with the invention;

FIG. 3 is a schematic diagram similar to FIGS. 1 and 2 of yet another modification of the process involved in producing articles made in accordance with the invention;

FIG. 3a shows a portion of FIG. 3 modified to show strips of previously bonded composites being bonded together.

Corresponding reference characters indicate corresponding parts throughout the several views of the drawings. For clarity of illustration in the drawings, the thicknesses of various thin parts are exaggerated.

Figure 4:
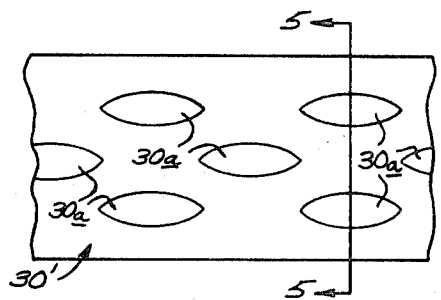
FIG. 4 is a top plan view of a composite article made in accordance with the invention.

Hereinafter the term "sheet" will be understood to comprehend plates, strips, or other areas of metal useful for carrying out the invention, and the term "metals" includes their alloys.

Referring now more particularly to FIG. 1 there are shown at numerals 1 and 3 coils of sheets 5 and 7 respectively in the form of strips of any malleable metal or metals capable of being solid phase bonded by processes such as described, for example, in Boessenkool et al U.S. Pat. No. 2,691,815. These strips may, for example, be AISI 1010 steel 0.050 inch thick, 24 inches wide. It is to be understood, however, that other metal strips may be employed and may each be composed of a metal different from that of the other.

Solid-phase bonding processes such as described in U.S. Pat. No. 2,691,815 call for careful cleaning of the faces of sheets 5 and 7 which are interfacially to be bonded, for example by cleaning with wire brushes 9 and 10. A stop-off pattern is applied in a suitable manner as by use of an endless mask web 12 which moves along a path parallel to and contiguous with a portion of the path followed by strip 5. A reservoir 14 of stop-off material is provided with suitable transfer rolls 16–22 to pick up and transfer a selected quantity of stop-off material onto strip 5 through mask 12 in the selected pattern. Suitable cleaning means such as air doctors 24 are provided to clean mask 12 prior to its contacting of strip 5. It will be understood that although application of the material is described as being put on only one inside face of a pair of strips, if desired, the pattern may be applied to two registrable parts, one on each inside face of strips 5 and 7. The particular stop-off material will be discussed infra. Following application of the stop-off pattern the stop-off material is dried. For this purpose a bank 26 of infra-red heaters has been found to be effective.

Strips 5 and 7 are brought together sandwiching the pattern therebetween. The strips are then rolled down using squeezing rolls 28 with a suitable reduction in their thickness with resulting elongation to form a composite sheet 30 which is elongated in the direction of rolling. In the rolling process the pattern elongates so that the original pattern is dimensioned to allow for that elongation. The reduction is made under conditions to bring about solid-phase green-bonding as taught for instance, in U.S. Pat. Nos. 2,691,815 and 2,753,623. The green-bonding occurs throughout the interfacial contact between the strips 5 and 7 with the exception of the area contiguous with the elongated stop-off pattern which forms a discontinuity in the bonded metal composite. In planning the shape of the extended pattern to be obtained in the composite 30, the applied pattern is made to have a shape suitably foreshortened in the direction of rolling. After completion of the green-bonding steps, the green bonds may be improved in the known manner by sintering at 32 at a suitable temperature to improve the metallurgical bond. As a result, there will be produced a solid-phase bonded composite 30 in which the stop-off pattern is embedded.

The stop-off material is selected so that it dissociates or decomposes when raised above a predetermined temperature thereby generating a gas which applies pressure on the unbonded portions of the sheet contiguous with the stop-off material and inflates the composite as defined by the applied pattern. The material preferably includes at least a portion which dissociates or decomposes at temperatures above the sintering temperature of the metal strips used to form the composite. In the case of low carbon steel, for example AISI 1010 which has a sintering temperature of approximately 500° C. Calcium Carbonate ($CaCO_3$) suspended in a vehicle such as a polyimide resin has been found to be effective. Calcium Carbonate decomposes to calcium oxide and carbon dioxide at approximately 700° C. That temperature is also sufficiently high to decompose the vehicle.

Once the composite 30 is sintered it may be formed at 36 into any desired configuration, some of which will be described in detail infra. Forming can include rolling the composite down to a smaller gauge, cutting, stamping, drawing, and in general bending the composite into a selected configuration including complex ones having compound reentrant surfaces, which for prior art reinforced structural members would not otherwise be feasible. That is, according to the present invention, complex reinforced configurations can be formed out of flat stock as would normally be done with non-reinforced material but then after it is so formed the composite is placed in suitable ovens as indicated at 38 so that its temperature is raised above a predetermined temperature, i.e. the sintering temperature, to approximately 700° C. where dolomite is used, to cause the dolomite to dissociate and inflate the composite as determined by the pattern of dolomite stop-off material to thereby reinforce the composite. Hence an article having a very complex surface configuration can be made easily and inexpensively by inflating the article after it has been formed.

As indicated by dashed line 34 in FIG. 1 the forming step 36 and inflating step 38 can be effected at a time and place not associated with the previous step. That is, composite 30 can be coiled and shipped to an end use location where the final forming and inflating could take place. It will be noted that no special equipment is required for the inflation, merely some means for raising the temperature of the composite above the predetermined temperature. Another approach to which the invention lends itself is in the forming of composite 30 into selected configurations at the site where the strips were bonded and to ship them to distribution areas where an end user can actually place the article in some structure and then raise the article to its inflation temperature. An example of this approach would be where the article is intended to be used as solar heat panel. The panel would be shipped in its flat state requiring minimal storage space, mounted in a solar panel frame and then inflated using a blow torch to raise it to the inflation temperature.

In some instances it is desirable to obtain a partial inflation before the forming step. Such inflation serves as a quality control measure which, particularly in a continuous process, is advantageous to ensure that the process steps are being properly carried out and that the stop-off material is being properly applied. However it should be noted that generally it is preferred not to use a two stage inflation process in conjunction with forming of particularly complex three dimensional configurations since it is advantageous to do such forming with flat stock as described above. Where the final configuration is amenable, two stage inflation allows the operator to take whatever corrective action may be required in the event that some process control has gone awry.

Table I includes several stop-off materials useful in practicing the invention, temperatures of decomposition and examples of metals with which the listed stop-off materials can be used.

TABLE I

| | STOP-OFF MATERIAL | APPROXIMATE TEMPERATURE OF DECOMPOSITION | EXEMPLARY METALS |
|---|---|---|---|
| A | $CaCO_3 \cdot MgCO_3$ | 700–800° C. | Steel, Ni, Co, Cr, Mn |
| B | $(CuCO_3)_2Cu(OH)_2$ | 200° C. | Aluminum |
| C | $CaCO_3$ | 800° C. | Steel |
| D | Bisphenol A-Epichlorohydrin Epoxy Ink (BE-170) | 250° C.* | Aluminum |
| E | Bisphenol A-Epichlorohydrin Epoxy Ink (ER-170) | 250° C.* | Aluminum |
| F | Black Polyester | 250° C.* | Aluminum |
| G | Aromatic Polyimide Polymer | 500° C.* | Copper, Steel |
| H | Polyurethane Based Paints | 180° C.* | Aluminum |

*The decomposition temperature may be higher depending upon pressure, composition of atmosphere, etc.

The present invention will be more readily apparent from a consideration of the following illustrative examples.

EXAMPLE 1

This example illustrates a two stage inflation discontinuous process using two aluminum strips as the sheets to be inflated. The stop-off material comprises a combination of B and D shown in TABLE I. More specifically, stop-off material was prepared using the following constituents:

Bisphenol A-Epichlorohydrin epoxy ink BE-170: (3 parts) (D TABLE I)
$2(CuCO_3)Cu(OH)_2$: (2 parts) (B TABLE I)
Thinner ER-180: (as needed)
Retarder ER-182

The thinner is used to obtain the desired consistency for the mode of application to be used along with a filler, such as $SiO_2$, to thicken the material if desired. In this case the material was applied in a selected pattern by a silk screening process. BE-170, ER-180 and ER-182 are products of NAZ-DAR Company of Chicago, Ill. BE-170 is a clear epoxy polymerizable through heat. $SiO_2$, colloidal silica is obtainable from Degaussa, Inc. of Trenton, N.J. under the trade name Aerosil 200. The aluminum sheets, AA 6061, 5 inches wide by 0.060 inch thick, were cleaned by passing them through wire brush rollers and then the stop-off material was applied to the interfacial surface of one of the aluminum sheets. The sheets having the stop off material were then heated at 180° C. for approximately 3–5 minutes to drive off the solvent. The sheets were then passed through squeeze bonding rollers obtaining a reduction in thickness in the direction of rolling of approximately 60% to produce a green bonded composite of the sheets except at portions thereof contiguous to the stop-off pattern. The composite was sintered at 275° C. for 30–40 minutes to perfect the metallurgical bond and effect partial inflation of the composite through the decomposition of component D of TABLE I. Final inflation was achieved by then raising the composite to approximately 400° C. for 30 minutes.

EXAMPLE 2

This example is similar to EXAMPLE 1 using a slightly different stop-off material. In this case the material was also silk screened onto the aluminum substrate and comprised the following:

Bisphenol A-Epichlorohydrin epoxy ink: 37 grams (E-TABLE I) ER-170
ER-176 catalyst: 7 grams
$(CuCO_3)_2Cu(OH)_2$: 8 grams (B-TABLE I)
$SiO_2$ filler: 0.6 grams
ER-180 thinner: as needed
ER-182 retarder: as needed As in the first example the aluminum sheets were cleaned, the stop-off material was applied by silk screening and dried at 180° C. for approximately three minutes. The ER-170 is also a clear epoxy polymerizable through heat initiated by the catalyst (ER-176) both products of NAZ-DAR Company. The epoxy and catalyst when mixed has a pot life of approximately 5–7 hours. The sheets were then squeeze roll bonded and sintered at 275° C. for approximately 30 minutes to perfect the bond between the sheets and effect partial inflation through the decomposition of component E of TABLE I. Final inflation was achieved by raising the composite to approximately 400° C. for 30 minutes.

The epoxy inks used in EXAMPLES 1 and 2 can be loaded with other compounds such as those shown in TABLE I up to 60%–70% by weight depending upon the crystalline structure of the compounds. That is, the more compactable the compounds due to the particular configuration of this crystalline structure, the higher the loading possible.

It will be noted that since the temperature of decomposition of the epoxy portion of the stop-off material is approximately 200° C., the heating step prior to bonding merely dries the stop-off material. The epoxy inks are particularly advantageous due to their low toxicity and high output of gases per unit weight.

EXAMPLE 3

In this example both sheets were aluminum AA 6061 as in Examples 1 and 2. However the stop-off material was applied to a separate aluminum sheet which was then placed between the outer sheets and were bonded thereto to become part of the composite. More specifically, a first aluminum plate was selected 12"×24"×0.064" thick
a second aluminum plate was selected 12"×24"×0.032" thick
an aluminum foil (No. AA 1145) 0.009 inches thick on which a pattern of stop-off material, as set forth in EXAMPLE 2 for two stage inflation, was silk-screened and was disposed between the first and second plates. The plates were squeezed through rolls to a 60% reduction in thickness and sintered for one-half hour between 260°–280° C. to improve the metallurgical bond.

The first stage inflation occurred during sintering with the decomposition of $(CuCO_3)_2Cu(OH)_2$, item B, TABLE I.

The composite was placed in an oven at 380°–420° C. to obtain the second stage inflation.

EXAMPLE 4

In this example a composite article was produced using a sheet of ASTM C10100 copper, a designation by the ASM Committee on copper and copper alloys, 3 inches wide by 0.040 inch thick and a sheet of AISI 1010 steel 0.032 inch thick. After suitable cleaning the following stop-off material was applied:

Epoxy ink BE-170 (D TABLE I): 1 part
CaCO$_3$ (C TABLE I): 1 part
Thinner ER-180: as needed Inflation was effected by sintering at 350–400° C. for 30 minutes for the first stage and 600° C. for 10 minutes for the second stage.

EXAMPLE 5

This example made use of the same stop-off material as in EXAMPLE 4 however both outer sheets were AISI 1010 steel 3 inches wide by 0.032 inches thick. The first stage information was effected during sintering at 500° C. for one half hour wherein the BE-170 epoxy ink (D TABLE I) decomposed. The second stage inflation was obtained by raising the temperature of the composite to approximately 800°–850° C. for 10–15 minutes.

EXAMPLE 6

In this example a composite was produced using ASTM C10100 copper sheets 3 inches with 0.040 inches thick as in EXAMPLE 4. Stop-off material was applied comprising:

13% solid solution in Methyl-pyrrolidone: (Item G TABLE I)
(Pyre-M.L.): 1 part
CaCO$_3$: 1 part
Methyl-pyrrolidone: As needed Pyre-M.L. is a registered trademark of E. I. duPont de Nemours and Company, for aromatic polyimide polymer high temperature varnish.

Curing of the pattern drives off the methyl-pyrrolidone and converts the polyamic acid to polyimide.

The first stage partial inflation occurred when the composite was sintered at 400° C. for one half hour until the polyimide polymer partially decomposed. The second stage inflation occurred by raising the composite to 600° C.–700° C. approximately 1–15 minutes, to complete the decomposition of the polyimide and CaCO$_3$.

EXAMPLE 7

In this example a composite comprising a sheet of ASTM C10100 copper 3 inches wide by 0.040 inches thick and a sheet of AISI 1010 steel 3 inches wide by 0.032 inches thick was made using the same stop-off material as used in EXAMPLE 6. The first stage inflation was obtained by sintering this steel at 400° C. for one half hour while the second stage was obtained by heating to approximately 800°–850° C. for approximately 10–15 minutes.

When it is desired to have no or minimal inflation during sintering, for example, where the composite is to be formed into a complex configuration, the drying temperature can be increased to 300° C. to decompose the organic as well as remove the vehicle. For a single stage inflation, black polyester, item F on Table I, CM 8561 obtainable from the Joseph E. Podgor Company, Inc., Pensauken, N.J., or polyurethane based paints item H of Table I are also suitable. The drying time is determined based on the vehicle of the ink.

In practicing the invention in a continuous process reference may be had to FIGS. 1–3a. As seen in FIG. 1, stop-off material is applied to strip 5 using an endless mask which moves along a portion of the path followed by strip 5 with the material being applied via rollers 16–22. Another convenient way to apply the desired pattern of stop-off material is shown in FIG. 2 where a strip 40 of transfer material is used, for example, foil or parchment paper, on which the stop-off pattern has previously been applied. Such transfer material can be stored in a suitable environment depending on the stop-off material employed. For example the stop-off material used in Example 3 with the 0.009 mil foil supra can be stored for up to twenty-four hours at a temperature of 100°–120° C. in a chamber without any protective atmosphere. When used as a transfer coating as seen in FIG. 2 the pattern is caused to be transferred from strip 40 to strip 5 by means of heated roller 42.

Figure 12:
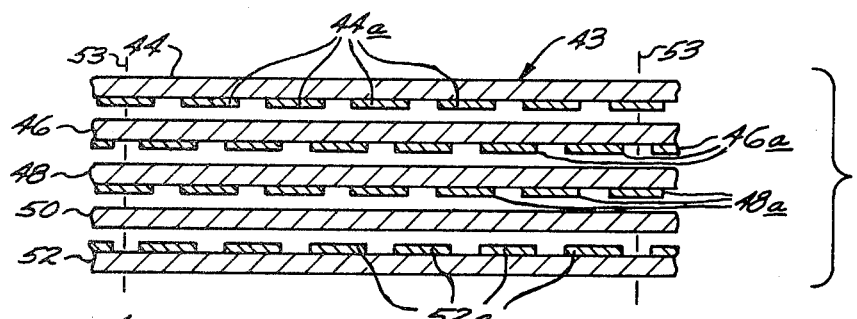
FIG. 12 is a cross sectional view of a plurality of metal sheets in which stripes of stop-off material have been disposed, the sheets being shown separated from one another as they would be prior to bonding.
Figure 13:
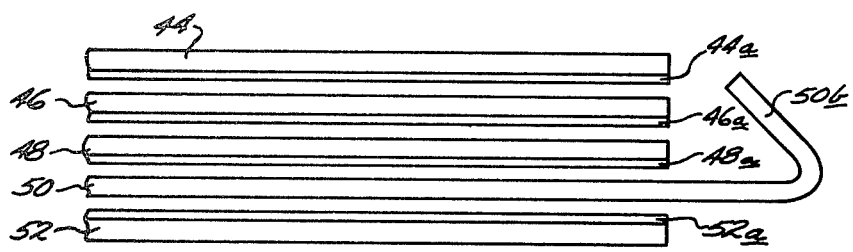
FIG. 13 is a side elevational view of the FIG. 12 sheets showing one of the sheets acting as a leader for the bonding process.
Figure 14:
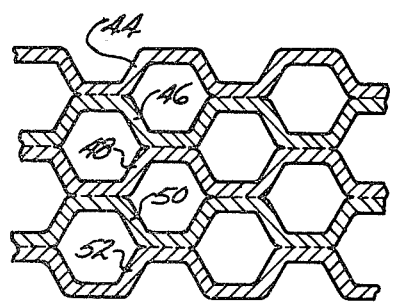
FIG. 14 is a cross sectional view of an inflated composite honeycomb type composite made from a plurality of sheets similar to those shown in FIGS. 12 and 13.

FIG. 3 shows the process as applied to several metallic strips 44, 46, 48, 50, 52. Such an arrangement can be used for example in forming a reinforced honeycomb structural member as seen in FIGS. 12 to 14. The honeycomb member and its method of fabrication will be discussed in detail infra.

Figure 5:
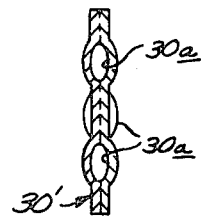
FIG. 5 is a cross sectional view taken on line 5—5 of FIG. 4.

FIGS. 4–11 show several composites having various patterns. As seen in FIGS. 4 and 5 composite 30' has a series of tear drop shaped inflated portions 30a which were produced from a pattern of similarly shaped tear drops but foreshortened to allow for elongation of the discontinuous areas on strips 5 and 7. These inflated areas provide structural reinforcement as well as a pleasing esthetic surface area.

Figure 6:
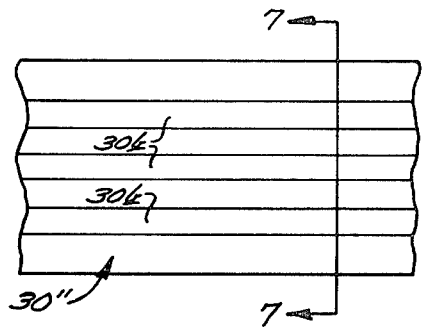
FIG. 6 is a top plan view similar to FIG. 4 of another embodiment of the invention.
Figure 7:
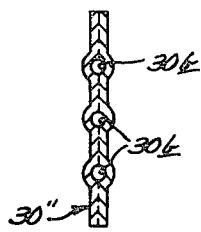
FIG. 7 is a cross sectional view taken on line 7—7 of FIG. 6.

Composite 30" shown in FIGS. 6 and 7 include a plurality of continuous inflated passages 30b which provide structural reinforcement in the direction of length of the composite as well as continuous passages for the conduction of fluids if so desired.

Figure 8:
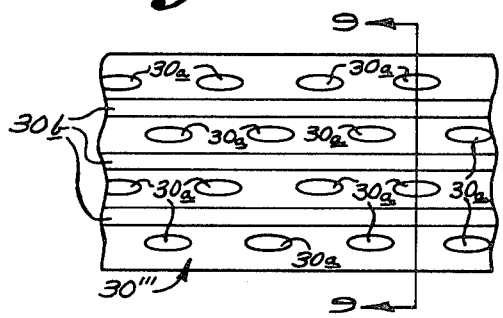
FIG. 8 is a top plan view similar to FIGS. 4 and 6 of another embodiment of the invention.
Figure 9:
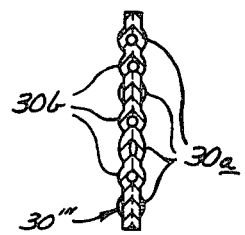
FIG. 9 is a cross sectional view taken on lines 9—9 of FIG. 8.

Composite 30''' shown in FIGS. 8 and 9 include both the discontinuous portions 30a and the continuous passage 30b to provide structural reinforcement in any selected direction along with the ability to circulate fluids if desired.

Figure 10:
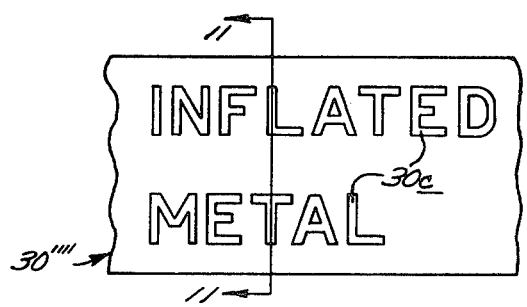
FIG. 10 is a top plan view similar to FIGS. 4,6, and 8 of another embodiment of the invention.
Figure 11:
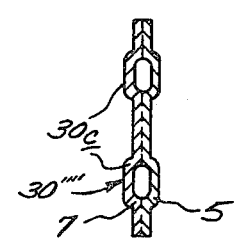
FIG. 11 is a cross sectional view taken on lines 10—10 of FIG. 9.

Composite 30'''' shown in FIGS. 10 and 11 include inflated portions 30c in the form of alpha numeric symbols indicating the wide flexibility of pattern designs the invention provides. It will be understood that if it is desired to have the inflation occur only on one facial surface of the composite, one layer, e.g., bottom layer 5 could be chosen to be significantly thicker than the other layer or the materials could be chosen with one material more easily deformed at the sintering and inflation temperatures.

EXAMPLE 8

With reference to FIGS. 3 and 12–14 a reinforced honeycomb structure 54 can be made by applying parallel stripes of stop-off material on a plurality of sheets 43 placed one on another, bonded, and then inflated. A honeycomb structure were produced using AA 5052 aluminum strips each having a starting thickness of 0.040 inches for strips 44 and 52 and 0.034 inches for strips 46, 48, and 50. Stop-off material used in both EXAMPLES 1 and 2 were employed for separate structures. Parallel stripes 44a, 46a, 48a, and 52a of EXAMPLES 1 and 2 stop-off material were applied to first and second respective strips 44, 46, 48, and 52. The stripes covers approximately 75% of the surface area of each respective interfacial surface area and were offset on alternate strips so that the open spaces on one strip were centered relative to the stripes on the next adjacent sheet and the stripes on every other striped strip were in alignment with each other. In composites having more than three sheets and when the size of the inflated cell is to be optimized, as in the FIG. 12-14 embodiment, it is preferred to have one of the inner strips free of stop-off material to enhance bonding of the sheets. Thus strip 50 had no stop-off material and was even provided with a leading edge 50b which extended beyond the other strips and was bent back on itself to function as a leader. It will be understood that if the stripes of stop-off material covered a smaller percentage of the interfacial surface area bonding between the strips would be also facilitated.

As in the previous examples, the strips were directed through squeeze bonding rolls and reduced down to approximately 0.064 inches in thickness. The green bonded composite was then sintered at 280° C. for one half hour and trimmed along dashed lines 53 in FIG. 12 such that the outer edge portions of 46 and 48 were bonded to each other as were the outer edge portion of sheets 50, 52 while the outer edge portion of sheets 44, 46 and 48, 50 were not bonded to each other. Each composite 43 was then brought up to the inflation temperature of 400°-420° C. for one half hour to produce the honeycomb structure 54 depicted in FIG. 14 with 75% unbonded interfacial area that results in a interfacial area that results in a shrinkage of the width of the composite in the order of 10-12%. Such honeycomb structures can be made discretely or in a continuous manner as indicated in FIG. 3. In that figure after the strips are cleaned by brushes, 9 stripes are applied to strips 44, 46, 48, and 52 in a conventional manner as by rollers 17 which obtain stop-off from reservoirs 14a which are dried by suitable infra red heater banks 26. The strips are then bonded and rolled down to a suitable thickness. After sintering it is preferred to trim the side edges of the composite so that stop-off material is in communication with the selected side edges so that inflation near the edge borders is not impeded.

As seen is FIG. 3a, two previously bonded composite sheets 43 can be in turn bonded together to increase the layers of honeycomb cells producing a new composite 43' which is then sintered to perfect the bond between the two composite sheets 43 and then inflated. It will be understood that this procedure can be used with more than two composite sheets, the only limitation being one of equipment.

Figure 15:
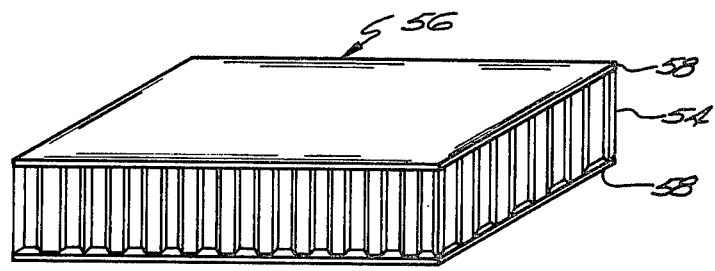
FIG. 15 is a perspective view of an article of manufacturing employing the honeycomb composite shown in FIG. 14.

FIG. 15 shows one of the many articles of manufacture for which the honeycomb structure 54 can be utilized. In that figure a light weight, structurally reinforced platform 56 used for instance for mounting various equipment to be moved or transported from one location to another comprises a top and bottom sheet 58 of aluminum, preferably one having a solder layer clad thereto, such as Eutectic aluminum, silicon alloy (87% aluminum and 13% silicon by weight) with a selected length of honeycomb structure 54 disposed therebetween. The longitudinal areas of the honeycomb cells extends generally perpendicular to the planes in which sheets 58 lie. The honeycomb structure can be easily cut to the selected length using conventional laser cutting techniques, high speed abrasive discs, or special saws and when placed between sheets 58 can be soldered securely thereon merely by raising the assembly to the soldering temperature of 600° C.

It will be noted that prior to inflation composite 30, 43 or 43' can be formed into a selected configuration including ones having compound reentrant surfaces. Once the desired configuration is selected and the necessary forming steps effected, the temperature of the composite is raised to the inflation level and it is blown up to selected reinforced shape.

Figure 16:
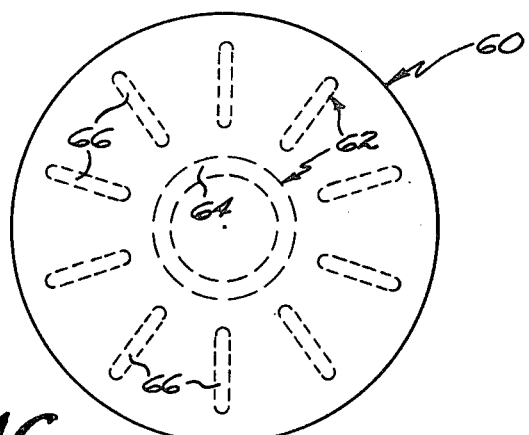
FIG. 16 is a top plan view of another embodiment of the invention showing a composite sheet after bonding with dashed lines indicating a selected pattern for reinforcement.
Figure 17:
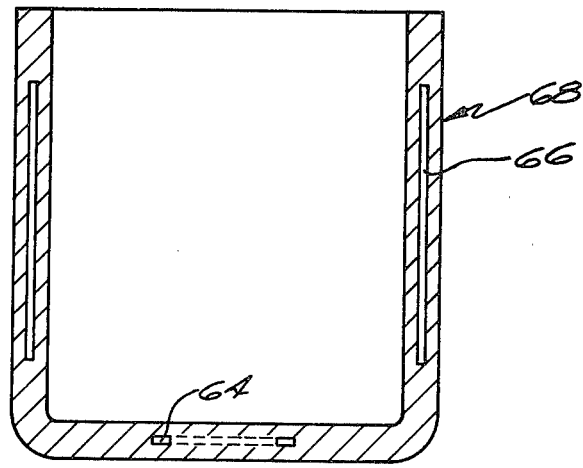
FIG. 17 shows a cross sectional view of the FIG. 16 composite after it has been drawn into a cup shaped configuration.
Figure 18:
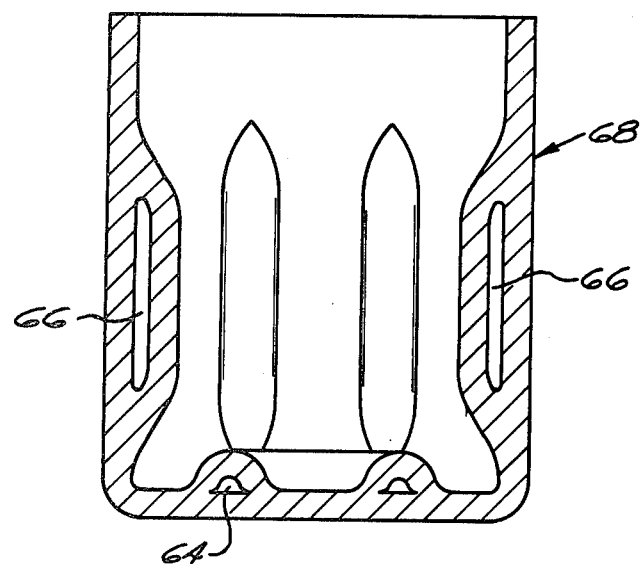
FIG. 18 is a cross sectional view of the cup shaped composite after it has been inflated.

FIGS. 15-17 show one example of a structurally reinforced article having compound reentrant surfaces. The article is made from a composite blank in which a pattern of stop-off material 62, preferably having a single stage inflation above the sintering temperature, comprises an annular central ring portion 64 with a series of radiating stripes 66 extending from a point close to the ring portion 64 to a point close to the outer periphery of blank 60. Following the sintering operation, blank 60 is formed into a cup shaped article 68 by conventional means as by drawing. Article 68 is then heated to the inflation temperature to produce the finished article. It will be understood that there are any number of different physical shapes which can easily be formed from flat stock in which a particular pattern of stop-off material has been disposed which can then be structurally reinforced merely by bringing the article up to the appropriate inflation temperature.

While the above disclosed articles have been formed primarily by bending the sheets in the unbonded areas thereby decreasing the total width of the composite in some instances it may be preferred to inflate the articles primarily by causing plastic flow of the unbonded areas by attenuating the strips in those areas. This can be accomplished by raising the temperature of the articles according to a temperature profile determined by the particular materials chosen. For example, the stop-off material may be comprised of a whole series of different portions which decompose at different levels of temperatures. That combined with a carefully maintained temperature profile can result in plastic material flow.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

We claim:
1. A process for producing a reinforced structural member comprising the steps of
   providing at least two flat sheets of malleable metal, the sheets of metal having a sintering temperature, disposing a selected pattern of stop-off material between at least two adjacent sheets, the stop-off material being thermally decomposable to generate a gas when raised above a given temperature, the stop-off material comprising first and second portions, the first portion generates gas at the sintering temperature and the second portion generates gas above a predetermined temperature higher than the sintering temperature,
   squeezing and solid state green bonding the sheets one to another,
   heating the sheets to a sintering temperature to improve the metallurgical bond therebetween and generate gas from decomposition of the first portion, and heating the sheets above the predetermined temperature to cause gas generation from decomposition of the second portion and concomitant separation and deformation of the sheets contiguous to the stop-off material.

2. A process for producing a reinforced structural member according to claim 1 in which the sheets are aluminum, the first portion of the stop-off material is composed of $2(CuCO_3) \cdot Cu(OH)_2$ and the second portion is composed of a bisphenol A-epichlorohydrin epoxy.

3. A process for producing a reinforced structural member according to claim 2 in which the sintering temperature is between 260°–280° C. and the predetermined temperature is 380° C.

4. A process for producing a reinforced structural member according to claim 3 in which the sheets are raised to between 380°–420° C. for approximately one half hour.

5. A process for producing a reinforced structural member according to claim 1 in which the sheets are copper, steel or combinations thereof, the first constituent of the stop-off material is composed of bisphenol A-epichlorohydrin epoxy and the second constituent of the stop-off material is composed of $CaCO_3$.

6. A process for producing a reinforced structural member according to claim 1 in which the sheets are copper, steel or combination thereof, the first portion of the stop-off material is an aromatic polyimide polymer and the second portion of the stop-off material is $CaCO_3$.

7. A process for producing a reinforced structural member according to claim 1 in which the sheets are steel, the first portion of the stop-off material is bisphenol A-epichlorohydrin epoxy second portion of the stop-off materail is $CaCO_3$.

8. A process for producing a reinforced structural member according to claims 5 or 6 in which the sheets are copper, the sheets are sintered at approximately 400° C. for approximately one half hour and the sheets are then raised to approximately 600° C. for between 10 and 15 minutes.

9. A process for producing a reinforced structural member according to claims 5 or 6 in which the sheets are steel, the sheets are sintered at approximately 500° C. for one half hour and are then raised to approximately 800°–850° C. for between 10 and 15 minutes.

10. A process for producing a reinforced structural member comprising the steps of providing at least two flat sheets of malleable metal, the sheets having a sintering temperature, disposing a selected pattern of stop-off material between at least two adjacent sheets, the stop-off material being composed of a plurality of portions, each portion being thermally decomposable to generate a gas when raised above a predetermined temperature, the predetermined temperature being different for each portion and selected so that gas generation can be effected according to a selected temperature profile, the predetermined temperature of at least some of the portions being above the sintering temperature, squeezing and solid state bonding the sheets one to another, heating the sheets according to the selected temperature profile to cause gas generation and concomitant separation and plastic flow of the sheets contiguous to the stop-off material.

* * * * *